United States Patent Office 3,801,544
Patented Apr. 2, 1974

3,801,544
HYDROGEN-FUNCTIONAL ORGANOPOLY-
SILOXANES
Alan E. Mink and Darrell D. Mitchell, Midland, Mich.,
assignors to Dow Corning Corporation, Midland, Mich.
No Drawing. Original application Mar. 8, 1972, Ser. No.
232,962, now Patent No. 3,732,330. Divided and this
application Jan. 2, 1973, Ser. No. 320,397
Int. Cl. C07f 7/02
U.S. Cl. 260—448.2 H                  2 Claims

ABSTRACT OF THE DISCLOSURE

Trimethylsilyl-terminated methylhydrogensiloxy diphenylsiloxy copolymers containing from about 20 to 45 mol percent diphenylsiloxy units give increased strength and flexibility when used as the curing agent for vinyl-functional organopolysiloxanes.

---

This is a division of application Ser. No. 232,962 filed Mar. 8, 1972 now Pat. No. 3,732,330.

This invention relates to hydrogen-containing organopolysiloxanes. In one aspect, the invention relates to an improved crosslinking agent for vinyl-functional organopolysiloxanes. In another aspect, the invention relates to a strong flexible resinous coating.

Organopolysiloxane resins in which the substituent organic groups are methyl, phenyl, vinyl and the like are often utilized as protective coatings and electrical impregnants or encapsulants. Such resins are usually applied as solventless liquids and are cured by a variety of mechanisms to obtain a hard infusible material. One curing mechanism involves the platinum-catalyzed reaction of $\equiv$SiH groups with $\equiv$SiCH=CH$_2$ groups at elevated temperatures. In compositions cured by this mechanism, the vinyl-functional siloxy units are present in the base resin and the $\equiv$SiH functionality is incorporated as a separate liquid component. The organic substituents of the organosiloxanes can be varied to increase the strength of the cured product but the high strength resins are quite rigid. Certain coating applications require flexibility as well as high strength.

The present invention provides novel hydrogen-functional organopolysiloxanes which can be combined with vinyl-functional resins to yield high strength flexible coatings.

Thus, it is an object of the present invention to provide novel hydrogen-functional organopolysiloxanes.

It is another object of the invention to provide novel curable siloxane compositions which upon heating give a high strength flexible material.

These and other objects of the invention will be apparent to one skilled in the art upon consideration of the following disclosure and appended claims.

In accordance with the invention there is provided a hydrogen-functional copolymeric organopolysiloxane fluid of the formula

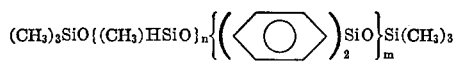

in which $n$ is an integer having a value of 2 or more, $m$ is an integer having a value of 1 or more, $n$ and $m$ having a total value sufficient to result in a fluid having a viscosity in the range of 20 to 2000 cs. at 25° C., said diphenylsiloxy units comprising from about 20 to 45 mol percent of said copolymer.

These copolymeric fluids are prepared by hydrolysis and condensation of the corresponding chlorosilanes utilizing conventional techniques well known in the art.

Further, in accordance with the invention there is provided an improved curable organosiloxane composition having the above-described copolymeric fluid incorporated therein. Such curable compositions consist essentially of a mixture of (a) a polysiloxane containing from 15 to 60 mol percent vinyl-functional siloxane units, the polysiloxane having an average of at least 8 silicon atoms per molecule, having a phenyl to silicon ratio of from 0.25:1 to 1.75:1 and having an average of at least one hydrocarbon substituent per silicon atom, the hydrocarbon substituents being selected from the group consisting of lower alkyl radicals containing 1 to 3 carbon atoms, the phenyl radical and the vinyl radical; (b) an organopolysiloxane fluid having at least two $\equiv$SiH groups per molecule, the organopolysiloxane being of the formula

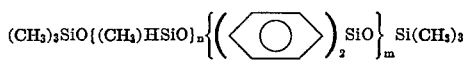

in which $n$ is an integer having a value of 2 or more, $m$ is an integer having a value of 1 or more, $n$ and $m$ having a total value sufficient to result in a fluid having a viscosity of from 20 to 2000 cs. at 25° C., the diphenylsiloxy units comprising from about 20 to 45 mol percent of said organopolysiloxane, the organopolysiloxane (b) being present in the mixture in an amount sufficient to provide from 0.75 to 1.5 mol of $\equiv$SiH per mol of vinyl substituent in (a); and (c) a platinum catalyst.

In a specific preferred embodiment of the invention which is especially suitable for coating traction motors and other electrical devices, the curable composition consists essentially of (a) a solventless liquid organosilicon resin consisting essentially of 30 to 65 mol percent $C_6H_5SiO_{3/2}$ units, 15 to 30 mol percent $CH_3(CH_2=CH)SiO$ units, 20 to 40 mol percent $(CH_3)_2SiO$ units, and 0 to 5 mol percent $R_3SiO_{1/2}$ units in which R is selected from the group consisting of lower alkyl radicals of from 1 to 3 inclusive carbon atoms, the vinyl radical and the phenyl radical, at least one R substituent being a lower alkyl radical, the resin having a silicon-bonded hydroxyl content of no more than 1 weight percent; (b) an organopolysiloxane fluid having at least two $\equiv$SiH groups per molecule, the organopolysiloxane being of the formula

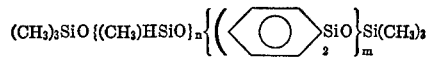

in which $n$ is an integer having a value of 2 or more, $m$ is an integer having a value of 1 or more, $n$ and $m$ having a total value sufficient to result in a fluid having a viscosity of from 20 to 2000 cs. at 25° C., the diphenylsiloxy units comprising from about 30 to 40 mol percent of said organopolysiloxane, the organopolysiloxane (b) being present in the mixture in an amount sufficient to provide from 0.75 to 1.5 mol of $\equiv$SiH per mol of vinyl substituent in (a); and (c) a platinum catalyst.

In the above-described curable compositions, siloxane (a) is the base resin and contains from 15 to 60 mol percent vinyl-functional siloxy units as crosslinking sites. Suitable vinyl-functional units include monovinylsioxane, divinylsiloxane, phenylvinylsiloxane, methylvinylsiloxane, ethylvinylsiloxane, divinylmethylsiloxane, divinylphenylsiloxane, vinyldimethylsiloxane, vinyldipropylsiloxane, vinylethylmethysiloxane, vinylidphenylsiloxane and vinylphenylmethylsiloxane. The other organo-substituted siloxy units present in the copolymeric base resin include monomethylsiloxane, monoethylsiloxane, dimethylsiloxane, dipropylsiloxane, monophenylsiloxane, diphenylsiloxane, phenylmethylsiloxane, trimethylsiloxane, dimethylethylsiloxane, dimethylphenylsiloxane, triphenylsiloxane and SiO$_2$ units. The preferred lower alkyl substituent is the methyl radical.

It is apparent that the copolymeric resin (a) can contain $R_3SiO_{1/2}$, $R_2SiO$, $RSiO_{3/2}$ and minor amounts of $SiO_2$ units, R being selected from the group of defined substituents. While the resin (a) contains an average of at least one organic substituent per silicon atom, it is preferred that the degree of substitution (R/Si ratio) be in the range of from 1.3 to 1.7.

Although there is no upper limit on the degree of polymerization of the resin (a), a lower limit of at least 8 silicon atoms per molecule is necessary to obtain desirable physical properties in the cured product. Optimal physical properties of the resin also require that the resin contain sufficient phenyl substituents to provide a phenyl to silicon ratio in the range of from 0.25:1 to 1.75:1. The copolymeric resins (a) can be liquid or solid, the liquid copolymers having viscosities in the range of from 1000 to 20,000 cs. at 25° C. being preferred.

The hydrogen-functional siloxane of the invention is compatible with the above-described resin (a) because of the diphenylsiloxy units present in the copolymer. In addition to compatibility, it is believed that the diphenylsiloxy units in amounts above 20 mol percent contribute to the ultimate strength of the cured product. The hydrogen-functional fluid is not stable above concentrations of 45 mol percent diphenylsiloxy units. The preferred range of from 30 to 40 mol percent diphenylsiloxy content gives an optimum of both strength and flexibility. The hydrogen-functionality must be in the form of methylhydrogensiloxy units; it being found that other forms of hydrogen-functionality, such as dimethylhydrogensiloxy units, do not provide the combination of strength and flexibility in the cured compositions. As a result of increased flexibility, the cured resin has better thermal shock resistance and can withstand drastic temperature change without cracking. Another benefit derived from the use of the difined copolymeric siloxane fluid is the stability and increased shelf life of the catalyzed curable composition.

To provide the crosslinking between the vinyl-functional siloxanes, the copolymer (b) must contain at least two methylhydrogensiloxy units per molecule. In addition to entering the crosslinking reaction, the hydrogen-functional siloxane acts as a diluent to reduce the viscosity of the curable composition when a solid or high viscosity resin is utilized as component (a). Effective dilution is obtained when the fluid (b) has a viscosity of 2000 cs. or less at 25° C.

The amount of hydrogen-functional siloxane (b) in the curable composition will vary with the amount of resin (a) and with the vinyl content of the resin, but in all cases there is sufficient siloxane (b) present to provide from 0.75 to 1.5 mol of ≡SiH per mol of vinyl substituents in the mixture. To obtain optimum crosslinking efficiency and superior physical properties, it is preferred that the ratio of ≡SiH to vinyl substituents be in the range of from 0.8:1 to 1.2:1.

The platinum catalyst (c) can be any of the known forms ranging from platinum metal to platinum deposited on carriers, such as silica gel or powdered charcoal, to platinic chloride, salts of platinum and chloroplatinic acid. Any of these forms will function as a catalyst in the curable compositions of the invention. Chloroplatinic acid, either as the commonly available hexahydrate or the anhydrous acid, is a preferred catalyst because of its easy dispersibility in the siloxanes and its lack of effect on the color of the curable compositions. Additional platinum compounds having utility as catalysts include $$PtCl_2[P(CH_2CH_2CH_3)_3]_2$$

platinum bromides, a complex of platinous halide and an olefin such as ethylene, propylene, butylene, cyclohexane and styrene, $$Pt(CH_3CN)_2Cl, [Pt(CH_3CN)_2(CH_3)_4]Cl_2,$$
$$Pt(NH_3)_2Cl_2, K[PtCl_3CH_2CH_2CH_2OH],$$
$$PtBr_2(C_2H_4)_2, K[PtBr_3(C_2H_4)], PtCl_2(C_2H_4),$$
$$(CH_3)_2C=CH_2 \cdot PtCl_2, H_2Pt(CN)_4 \cdot 5H_2O,$$
$$H[PtCl_3(CH_3CN)], Pt(NH_3)_2(CNS)_2,$$
$$[Pt(NH_3)_4] \cdot [PtCl_4], PtCl_2[P(CH_2CH_3)_3]_2,$$

$$PtCl_2 \cdot PCl_3, PtCl_2 \cdot P(OH)_3, PtCl_2/P(OCH_2CH_3)_3,$$
$$PtCl_2 \cdot [P(OCH_2CH_3)_3]_2, Pt(OOCCH_2SCH_2CH_3)_2,$$
$$Pt(CN)_3, (CH_3)_4Pt,$$

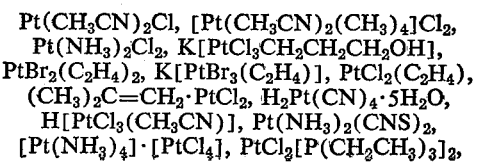

$PtCl_2CO$ and $PtBr_2CO$.

There should be at least 0.1 part by weight platinum per million parts by weight of the combined total weight of (a), (b) and (c). However, since impurities in the system may readily poison the small quantity of catalyst it is preferred to employ from 1 to 20 parts per million of platinum. A greater amount of platinum does not effect the reaction but economic considerations suggest usage within the mentioned limits.

The curable compositions can be plasticized if desired. Suitable plasticizers include low molecular weight organosiloxanes compatible with resin (a), such as phenylmethylpolysiloxanes, and compatible heat-stable organic resins. Especially suitable plasticizers are low viscosity siloxanes having both phenyl and vinyl functionality, for example, divinyldimethyldiphenyldisiloxane. The phenyl content of such fluid siloxanes renders them compatible with resin (a) and the vinyl substituents provide reaction sites for immobilization by curing. The plasticizing action is important in those compositions containing a base resin (a) of such high viscosity that the required amount of siloxane fluid (b) is not sufficient to give an easily handled, flowable material. In those compositions containing a vinyl-siloxane plasticizer, the amount of hydrogen-functional siloxane (b) should be increased so that the amount of ≡SiH relative to the total vinyl content of base resin (a) and the plasticizer remain within the range of 0.75:1 to 1.5:1.

When the curable compositions of the invention are utilized as coatings for electrical devices, it is desirable that the compositions cure without the evolution of volatiles which would form voids or bubbles in the coating. Voids can be caused by the reaction of ≡SiH with ≡SiOH which is often present in the base resin (a). When necessary, the base resin (a) can be reacted with alkaline condensation catalysts, such as sodium hydroxide, in a solvent to reduce the hydroxyl content to an acceptable level, such as less than one percent as specified in the preferred embodiment of the invention.

Heat stable fillers can be incorporated in the curable compositions of the invention. Suitable fillers include glass fibers, finely divided silica, crushed quartz, powdered glass, asbestos, talc, carbon black, iron oxide, titanium dioxide, magnesium oxide and the like. Other additives such as pigments, dyes, oxidation inhibitors and release agents can also be utilized.

The curable compositions can be employed in any conventional manner for coating, casting or impregnating. The siloxane resin (a), the hydrogen-functional fluid (b) and the platinum catalyst (c) are mixed together with any desired plasticizer, filler and additives and the resultant mixture is fabricated into the desired form, followed by curing at elevated temperatures. In some instances, it may be desirable to post cure at higher temperatures, for example 200° C., to improve physical properties.

The described compositions are particularly useful for impregnating and encapsulating electrical equipment, for coating electrical conductors and for use as protective coatings on metals and other substrates.

The following examples are intended as illustrative and should not be construed as limiting the invention delineated in the claims.

EXAMPLE 1

An organopolysiloxane resin comprising 20 mol percent $CH_3(CH_2=CH)SiO$, the remaining copolymeric units being $C_6H_5SiO_{3/2}$, $CH_3SiO_{3/2}$, $(CH_3)_2SiO$ and $$(CH_3)_3SiO_{1/2},$$

having a phenyl to silicon atom ratio of about 0.4, a viscosity of 12,567 cs. at 25° C. and a silicon-bonded hydroxyl content of less than 0.1 weight percent was mixed with sufficient hydrogen-functional siloxane having a viscosity of about 250 cs. at 25° C. to provide 1.0 mol ≡SiH per mol of ≡SiCH=CH$_2$ in the resin. The hydrogen-functional siloxane consisted of 10 mol percent (CH$_3$)$_3$SiO$_{1/2}$ units, 40 mol percent (C$_6$H$_5$)$_2$SiO units and 50 mol percent (CH$_3$)HSiO units. Chloroplatinic acid was added to the siloxane mixture to provide a curable composition containing ~10 p.p.m. by weight of platinum.

The above composition was cast in the form of 0.3 inch-diameter rods and cured. When cured for 16 hours at 150° C., the crosslinked material had a flex strength of 4283 p.s.i. and a deflection of 0.33 inch across a 2 inch span at the breaking strength. When cured for 16 hours at 200° C., a 0.3 inch-diameter rod of the crosslinked material had a flex strength of 6240 p.s.i. at a deflection of 0.22 inch when tested in the same manner.

For purposes of comparison, a second curable composition was prepared by mixing the above-described resin with sufficient siloxane consisting of 57 mol percent (CH$_3$)HSiO, 14.3 mol percent C$_6$H$_5$SiO$_{3/2}$, 14.3 mol percent (CH$_3$)$_2$SiO and 14.3 mol percent (CH$_3$)$_3$SiO$_{1/2}$ to provide 1 mol ≡SiH per mol of ≡SiCH=CH$_2$ in the composition. Chloroplatinic acid was added in an amount sufficient to provide ~10 p.p.m. by weight platinum and the curable composition was cast as 0.3 inch-diameter rods. When cured for 16 hours at 150° C., the crosslinked composition exhibited a flex strength of 4335 p.s.i. at a deflection of 0.14 inch, while curing for 16 hours at 200° C. gave a flex strength of 4502 p.s.i. at a deflection of 0.15 inch.

This comparison demonstrates that the hydrogen-functional siloxane of the invention gives a 135 percent increase in deflection while retaining strength equivalent to that obtained from a hydrogen-functional siloxane previously considered best for use in the described compositions. When cured under the more severe conditions, the compositions of the invention exhibited an increase of about 40 percent in strength and 55 percent in deflection as compared to a composition utilizing a different hydrogen-functional siloxane.

EXAMPLE 2

The gel times of the compositions prepared in Example 1 were determined to compare the relative shelf life of the materials. The times required for gellation of the liquid catalyzed uncured compositions were determined at various temperatures. Gel times for the composition of the invention (designated as Composition No. 1) and the comparative material of Example 1 (designated as Composition No. 2) are given below:

| Composition | Gel time (min.) | |
|---|---|---|
| | No. 1 | No. 2 |
| Temperature (° C.): | | |
| 150 | 9 | 3½ |
| 175 | 4 | 2½ |
| 200 | 3 | 2 |

Thus, it is evident that the hydrogen-functional siloxane contributes significantly to the stability of the catalyzed composition and extends the bath life of such materials when utilized in dip coating operations.

EXAMPLE 3

Other phenyl-containing hydrogen-functional siloxanes were substituted for the siloxane of the invention in the curable composition of Example 2. The materials were added in an amount sufficient to provide 1 mol ≡SiH per mol of ≡SiCH=CH$_2$.

The first such composition contained

such as disclosed in U.S. Pat. No. 3,020,260. The composition was cast as a 0.3 inch-diameter rod and cured for 16 hours at 200° C. Although rigid and self-supporting, the cured rod deflected beyond the parameters of the testing apparatus at a load of 1250 p.s.i.

A second curable composition utilized the

crosslinker disclosed in U.S. Pat. No. 2,915,497. When cast as a rod and cured for 16 hours at 200° C., the crosslinked material was again too flexible for testing, the deflection exceeding the apparatus limitations at 250 p.s.i.

The data demonstrate the effect that the nature of the crosslinking agent has on the physical properties of the crosslinked products of resin compositions. It is also evident that the prior art does not provide siloxanes having equivalent strength and flexibility.

Reasonable modification and variation are within the scope of the invention which is directed to novel hydrogen-functional polysiloxanes and curable compositions utilizing such siloxanes.

That which is claimed is:

1. A copolymeric organopolysiloxane fluid of the formula

in which $n$ is an integer having a value of 2 or more, $m$ is an integer having a value of 1 or more, $n$ and $m$ having a total value sufficient to result in a fluid having a viscosity in the range of 20 to 2000 cs. at 25° C., said diphenylsiloxy units comprising from about 20 to 45 mol percent of said copolymer.

2. The copolymeric organopolysiloxane in accordance with claim 1 in which the diphenylsiloxy units comprise from about 20 to 40 mol percent of said copolymer.

References Cited

UNITED STATES PATENTS

| | | | |
|---|---|---|---|
| 3,234,180 | 2/1966 | Wu | 260—448.2 H |
| 3,398,174 | 8/1968 | Barnes | 260—448.2 H |
| 2,637,718 | 5/1953 | Rust | 260—448.2 H X |
| 2,877,256 | 3/1959 | Clark et al. | 260—448.2 H |
| 2,645,629 | 7/1953 | Nitzsche | 260—448.2 H X |
| 2,547,678 | 4/1951 | Wilcock et al. | 260—448.2 H |
| 2,483,158 | 9/1949 | Sprung et al. | 260—448.2 H |

DANIEL E. WYMAN, Primary Examiner

P. F. SHAVER, Assistant Examiner

U.S. Cl. X.R.

260—46.5 R, 46.5 G